Jan. 6, 1970   P. A. KEELEY   3,487,939
APPARATUS FOR SEPARATING FERROMAGNETIC MATERIAL FROM A LIQUID
Filed Nov. 14, 1967   3 Sheets-Sheet 1

INVENTOR.
PHILLIP ALBAN KEELEY
BY
AGENT

Jan. 6, 1970     P. A. KEELEY     3,487,939
APPARATUS FOR SEPARATING FERROMAGNETIC MATERIAL FROM A LIQUID
Filed Nov. 14, 1967     3 Sheets-Sheet 3

INVENTOR.
PHILLIP ALBAN KEELEY
BY
AGENT

United States Patent Office 3,487,939
Patented Jan. 6, 1970

3,487,939
APPARATUS FOR SEPARATING FERROMAGNETIC MATERIAL FROM A LIQUID
Phillip Alban Keeley, Warrington, England, assignor, by mesne assignments, to U.S. Philips Corporation, New York, N.Y., a corporation of Delaware
Filed Nov. 14, 1967, Ser. No. 682,818
Claims priority, application Great Britain, Nov. 15, 1966, 51,068/66
Int. Cl. B01d 33/04
U.S. Cl. 210—222          6 Claims

ABSTRACT OF THE DISCLOSURE

An apparatus for separating ferromagnetic material from a mixture, comprises a continuous belt having a 1st position adjacent a magnetic field, a 2nd position remote from the field, and a 3rd position adjacent an auxiliary magnet field, means for introducing the mixture to the belt in its 1st position whereby the ferromagnetic material therein is attracted by the field onto the belt, carried by the belt through 2nd position to 3rd position where it is attracted off of the belt by the auxiliary field.

---

This invention relates to an apparatus for separating ferromagnetic material from a liquid contaminated with such material, for example, machine tool coolant. The invention relates particularly to an apparatus comprising an endless belt, means for driving the belt, means for guiding the belt up an inclined path, means for conducting the contaminated liquid over the upper surface of the belt at the lower end of said inclined path, permanent magnetic means arranged subjacent the belt in said inclined path so as to draw ferromagnetic contaminant from the liquid onto the upper surface of the belt, and means arranged adjacent the belt at or near the upper end of said inclined path, or at a point in the path of movement of the belt outside said inclined path, for removing from the belt contaminant adhering thereto.

Such apparatus is known with a scraper being used for removing contaminant adhering to the belt. This has a disadvantage when the contaminant liquid contains sharp or jagged pieces of ferromagnetic metal, for example, steel swarf, since there is a tendency for such pieces to jam between the scraper and the belt and tear the belt. It is an object of the invention to provide improved means for removing contaminant from the belt, which does not suffer from this disadvantage.

According to the invention there is provided an apparatus for removing from the belt ferromagnetic contaminant adhering thereto, comprise means having a continuous surface movable into proximity with the belt and away from the belt, and means for creating at the surface a magnetic field such that ferromagnetic contaminant is drawn from the belt onto the surface and carried away from the belt by the surface. The continuous surface may be arranged to be driven by the means for driving the belt. Preferably, the continuous surface is formed by the outer cylindrical surface of a rotatable drum located subjacent the belt, and the means for creating a magnetic field are located inside the drum and; a scraper may be provided for removing contaminant adhering to the drum.

The means for creating a magnetic field may be arranged eccentrically in the drum in a position such that the strength of the field decreases in a direction away from the belt. This means may comprise a co-axial assembly of discs of soft ferromagnetic material spaced apart by cylindrical permanent magnets which are magnetized axially and assembled in alternately opposite magnetic directions so that adjacent discs form pole pieces of opposite polarity.

Figure 1:
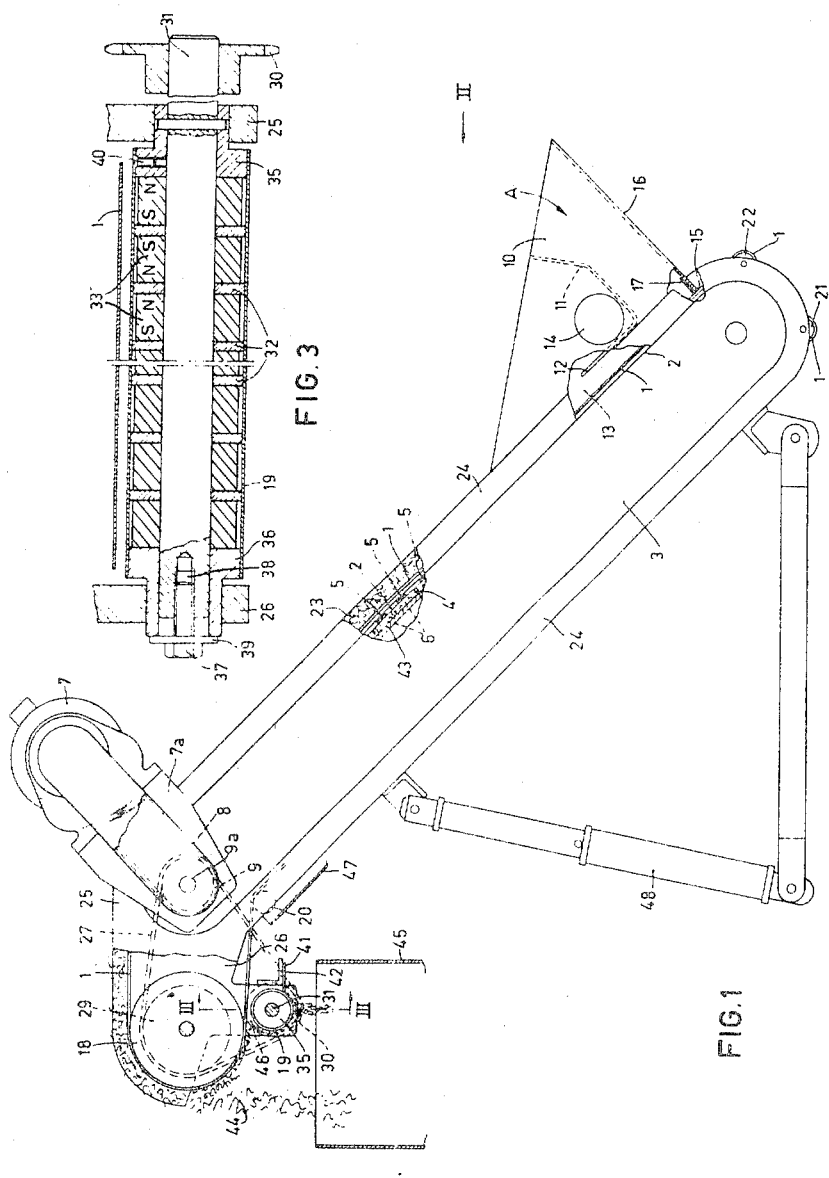
Figure 2:
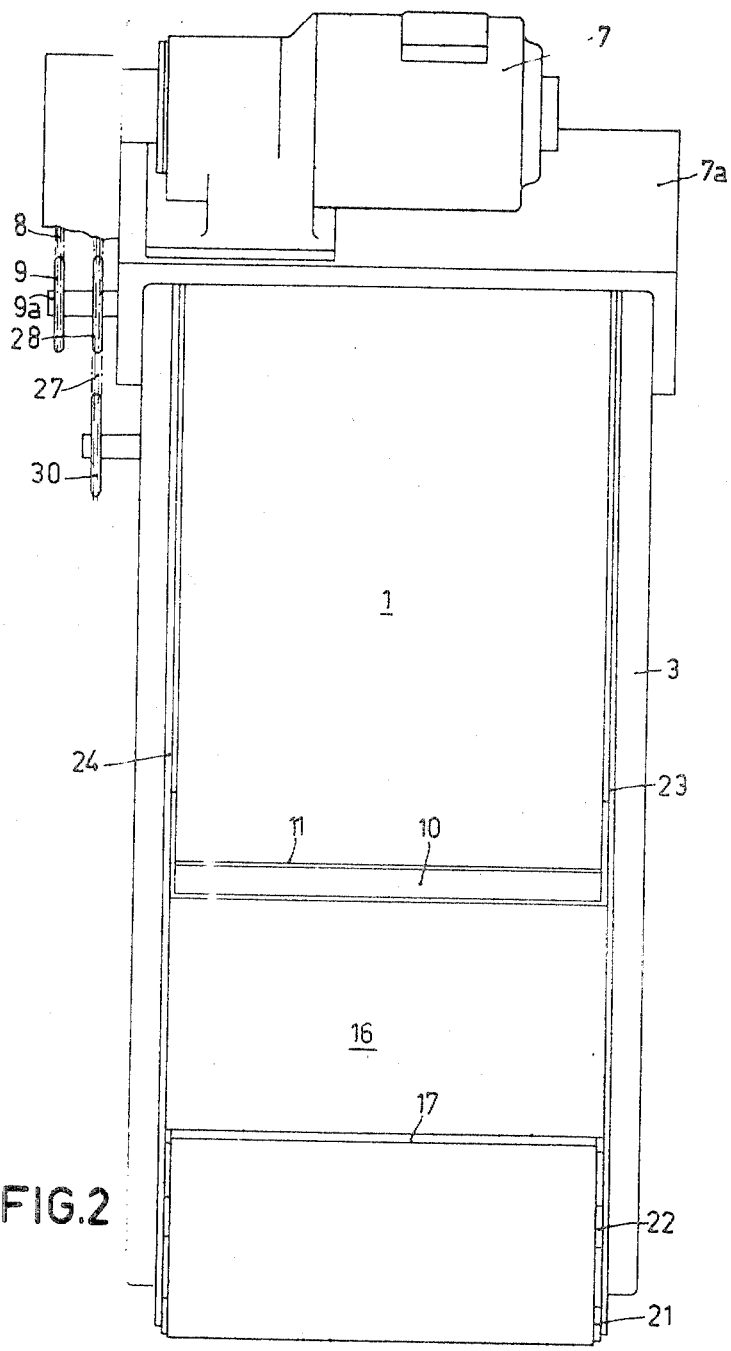
Figure 4:
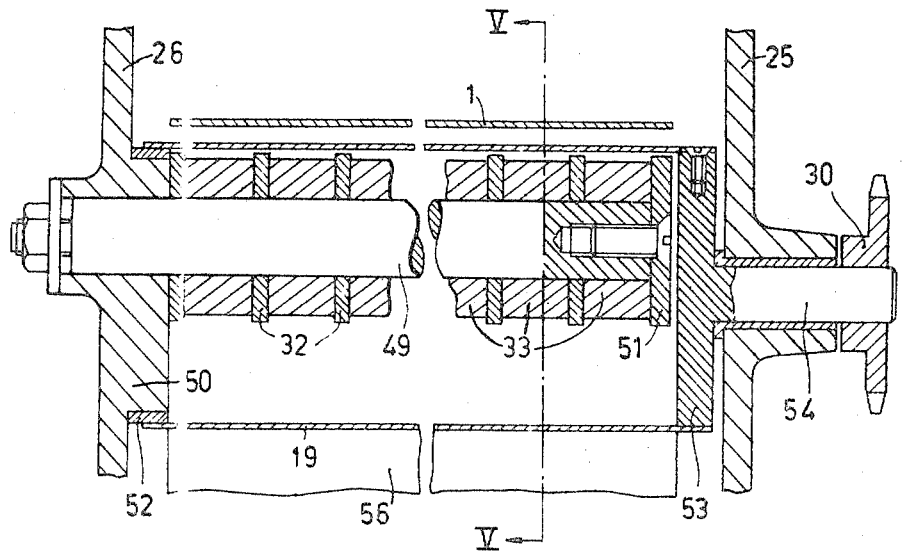
Figure 5:
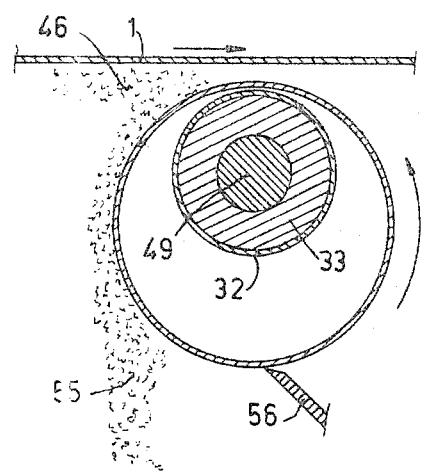

In order that the invention may be readily carried into effect, reference will now be made by way of example to the accompanying drawings, in which:

FIGURE 1 is a side elevation of an apparatus according to the invention,

FIGURE 2 is a front elevation of this apparatus looking in the direction of the arrow II in FIGURE 1, FIGURE 3 is an enlarged sectional view of one embodiment of the means for removing contaminant from the belt, the section being taken on the line III—III in FIGURE 1, FIGURE 4 is a similar view of another embodiment of these means, and FIGURE 5 is a sectional view taken on the line V—V of FIGURE 4.

In the paparatus shown in FIGURES 1 and 2, an endless belt 1, which may be made of a reinforced plastic, for example, travels up a ramp 2 made of a non-magnetisable material, for example stainless steel. The ramp forms the upper wall of a casing 3 housing a travelling assembly of permanent magnets. This assembly may be similar to that described and illustrated in the complete specification of our co-pending patent application No. 37,503/65, now British Patent No. 1,120,481 and as such comprises a series of parallel rows of permanent magnets carried on two parallel endless chains which are inclined at the same angle as the ramp 2 and which pass round sprockets (not shown) in the upper and lower ends of the casing 3. Part of the side wall of the casing is broken away in FIGURE 1 to show a portion 4 of one of the chains and also, at 5, the end magnets of three of the rows of magnets, which may be ring magnets. The rows of magnets are closely spaced and are distributed over the entire length of the chains, each row being mounted on a separate flat steel bar 6 fixed at its ends to the chains. The chains are driven by an electric motor 7 mounted on a bridge 7a which extends over the upper end of the ramp 2 and is secured to the side walls of the casing 3. The drive from the motor is transmitted through a speed-reduction gear (not shown) and a chain 8 to a sprocket 9 fixed on a shaft 9a on which are also fixed the sprockets in the upper end of the casing 3. The sprockets in the lower end of the casing are mounted on a shaft 9b.

Mounted on the ramp 2 at the lower end thereof is a tank 10 for receiving the contaminated liquid, which will be assumed to be lathe coolant containing ferromagnetic swarf. As indicated by the arrow A in FIGURE 1, the contaminated coolant enters the tank on one side of a partition 11 which extends across the interior of the tank transversely of the ramp 2 and which is bent round at the bottom to extend parallel, or approximately parallel, with the ramp for a short distance, as shown at 12 in FIGURE 1. This part of the partition forms with the ramp a duct 13 through which the coolant passes to the other side of the partition, where an outlet 14 is provided for clean coolant. The endless belt 1 travels through the duct 13, having entered the tank 10 through a gap 15 (FIGURE 1) between the bottom of the front wall 16 of the tank and the ramp 2. A flexible sealing strip 17 is secured to the inner side of the wall 16 and arranged to engage the upper surface of the belt 1 to prevent coolant leaking through the gap 15.

At the upper end of the ramp 2 the belt 1 leaves the ramp to pass round a driving roller 18. From this roller the belt travels past a rotary drum 19, which will be described below, and then over a guide roller 20 supported beneath the upper end of the casing 3. The belt travels down the underside of the casing and around two guide rollers 21 and 22 at the lower end of the casing to return to the ramp 2. During its passage around the casing the belt is guided at its edges by two flanges 23 and 24 on the casing. The guide rollers 20, 21 and 22 can conveniently be supported by these flanges, as shown in FIGURE 1.

The driving roller 18 and the drum 19 are supported at their ends by two brackets 25 and 26 projecting from the upper end of the casing 3. Part of the bracket 25 is broken away in FIGURE 1 to show the roller and the drum. The roller 18 and drum 19 are driven by the motor 7 through a chain 27 which passes around a sprocket 28 fixed on the shaft 9a and around sprockets 29 and 30 fixedly connected to the roller 18 and drum 19 respectively. The drive to the roller 18 and the chains carrying the magnets 5 is preferably so arranged that the belt 1 and the magnets travel at approximately the same speed.

The drum 19 is made of non-magnetisable material. In the embodiment shown in FIGURE 3 the drum is rotatable with a shaft 31, also made of non-magnetisable material, on which the sprocket 30 is fixed and on which is mounted a co-axial assembly of centrally apertured discs 32 of soft ferromagnetic material spaced apart by cylindrical permanent magnets 33 which are also centrally apertured. The magnets 33 are magnetised axially and assembled in alternately opposite magnetic directions so that adjacent discs form pole pieces of opposite polarity, as indicated in FIGURE 3. The drum 19 concentrically surrounds the assembly of pole pieces and magnets and has a sliding fit on the pole pieces the outer edges of which project slightly beyond the outer peripheries of the magnets. The pole pieces and magnets are clamped together in assembled relationship by two flanged sleeves 35 and 36 which are rotatable in apertures in the brackets 25 and 26 respectively. The sleeve 35 is pinned to the shaft 31, and the sleeve 36 is pressed towards the sleeve 35 by a bolt 37 which is screwed into a threaded axial bore 38 in the adjacent end of the shaft 31 and which acts on the sleeve 36 through a washer 39. The flange of the sleeve 36 fits slidably in the adjacent end of the drum 19, which at its other end is secured by a screw 40 to the flange of the sleeve 35.

The sleeves 35 and 36 also act as pole pieces. The outer surface of the drum 19 is engaged by a scraper 41 which is supported by an angle bar 42 fixed to the brackets 25 and 26. Instead of being made of non-magnetisable material, the shaft 31 may be made of a magnetisable material, for example, mild steel, and a sleeve of non-magnetisable material, for example, brass, interposed between the shaft and the pole pieces 32 and magnets 33.

In the operation of the above apparatus, the endless chains in the casing 3, guided by chain guides 43 (FIGURE 1) fixed on the side walls of the casing, move the rows of magnets 5 up an inclined path parallel with, and adjacent the underside of, the ramp 2. As the magnets pass beneath the tank 10 they attract the ferromagnetic swarf in the coolant passing through the duct 13, and draw this swarf onto the upper surface of the endless belt 1. The belt carries the swarf out of the tank 10 and up the ramp 2, the swarf remaining held to the belt by the attraction of the magnets. At the upper end of the ramp the swarf is released from this attraction, and as the belt passes round the driving roller 18 the larger pieces of swarf fall from the belt, as shown at 44 in FIGURE 1, into a bin 45. Many of the smaller pieces, however remain stuck to the belt by the coolant adhering to the belt, and it is to remove these pieces that the rotary drum 19 and magnetic assembly 32, 33 are provided. As the belt passes the drum 19, the pieces of swarf adhering to the belt are drawn off the belt onto the outer cylindrical surface of the drum, by the magnetic fields produced between the pole pieces 32 of the magnetic assembly, as shown at 46 in FIGURE 1. The swarf is carried away from the belt by the drum and then removed from the drum by the scraper 41 to fall into the bin 45.

The drum is arranged close to the belt 1 but preferably not in contact with it. The object of this is to avoid the coolant which adheres to the belt being squeezed from the belt by the drum and falling into the bin 45. Instead this coolant is squeezed from the belt by the guide roller 20 and is caught and carried away by an inclined channel 47 arranged beneath the casing 3.

In the embodiment shown in FIGURES 4 and 5 a fixed assembly of pole pieces 32 and magnets 33 similar to the pole pieces and magnets in FIGURE 3 is arranged eccentrically in the drum 19. The pole pieces and magnets are clamped on a rod 49 of non-magnetisable material which is fixed at one end in the bracket 26. The pole pieces and magnets are clamped between a cylindrical boss 50 on the bracket 26 at one end and a circular plate 51 at the other end. The plate 51 also acts as a pole piece. One end of the drum 19 is rotatably supported on a bronze bushing 52 on the boss 50 and the other end of the drum is secured to a circular plate 53 which is formed co-axially with a stub shaft 54 rotatable in a bushed aperture in the bracket 25. The sprocket 30 is fixed on the shaft 54 to drive the drum 19. While the drum rotates, the magnetic assembly 32, 33 remains stationary in the upper part of the drum.

Due to the eccentric disposition of the magnetic assembly 32, 33 in the drum 19, the magnetic attraction at the surface of the drum decreases from the top to the bottom of the drum. At the top the magnetic attraction is strong enough to draw onto the surface of the drum the pieces of swarf adhering to the belt 1, as shown at 46 in FIGURE 5. As the swarf is carried away from the belt by the drum, it is subjected to progressively weaker magnetic attraction until eventually it falls off the drum, as shown at 55 in FIGURE 5. A scraper may be provided, as shown at 56, to remove any swarf which may remain stuck to the drum by coolant. A stationary assembly of magnets may be used beneath the ramp 2 instead of the travelling assembly described above. The apparatus is supported by a structure which includes a telescopic strut 48 to enable the slope of the ramp 2 to be varied.

What is claimed is:
1. An apparatus for separating ferromagnetic material out of a mixture, comprising:
 (a) a frame;
 (b) a non-magnetic carrier formed of adjacent portions movable on the frame;
 (c) means on the frame forming a primary magnetic field separate and spaced from the carrier;
 (d) means on the frame forming an auxiliary magnetic field separate and spaced from the primary magnetic field,
 (e) means for moving the carrier long a path, this path defining (i) a 1st position adjacent the primary magnetic field, (ii) a 2nd position outside the primary field, and (iii) a 3rd position adjacent the auxiliary magnetic field, and
 (f) means for introducing quantities of the mixture to said portions of the carrier, the ferromagnetic material of the mixture at each of said portions sequentially (i) being held thereto by the primary magnetic field when said portion is in said 1st position, and (ii) being releasable from said portion at its 2nd position, and material remaining on said portion being drawn therefrom by the auxiliary magnetic field when said portion is in 3rd position.

2. Apparatus as defined in claim 1 wherein the carrier is a continuous belt comprising said portions.

3. Apparatus as defined in claim 2 wherein said primary magnetic field comprises a 2nd belt (i) having magnetic parts and (ii) being movable such that the movement of said parts corresponds to that of said carrier portions while in their respective 1st positions.

4. Apparatus as defined in claim 2 wherein said auxiliary magnetic field comprises:
 (a) a magnet means disposed along a 1st fixed axis adjacent the carrier's 3rd position,
 (b) a non-magnet sleeve circumscribing the magnet and rotatable about a 2nd fixed axis spaced from the 1st axis, whereby circumferential segments of the sleeve move eccentrically about the magnet, the segments cyclically being closely adjacent both the magnet and the carrier, and then remote from both, and (e) means adjacent the sleeve in said remote position for scraping from its surface ferromagnetic material attracted thereto while in its position closely adjacent the magnet.

5. Apparatus as defined in claim 4 wherein said cylindrical magnet means comprises:
   (a) a central shaft of non-magnetisable material,
   (b) a plurality of annular permanent magnets carried by the shaft and spaced from each other,
   (c) a plurality of annular pole pieces of soft ferromagnetic material, one disposed on the shaft between each two annular magnets.

6. Apparatus as defined in claim 5 wherein the adjacent ends of each two magnets are opposed in polarity.

References Cited

UNITED STATES PATENTS

| | | | |
|---|---|---|---|
| 2,854,137 | 9/1958 | Grunel | 209—215 |
| 3,357,559 | 12/1967 | Israelson | 210—223 |

REUBEN FRIEDMAN, Primary Examiner

T. A. GRANGER, Assistant Examiner

U.S. Cl. X.R.

210—391, 400